(12) United States Patent
Hineno

(10) Patent No.: US 9,127,830 B2
(45) Date of Patent: Sep. 8, 2015

(54) SURFACE LIGHT SOURCE APPARATUS AND LIQUID CRYSTAL DISPLAY APPARATUS

(75) Inventor: Mitsuru Hineno, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 39 days.

(21) Appl. No.: 14/004,055

(22) PCT Filed: Feb. 17, 2012

(86) PCT No.: PCT/JP2012/001068
§ 371 (c)(1),
(2), (4) Date: Sep. 9, 2013

(87) PCT Pub. No.: WO2012/120794
PCT Pub. Date: Sep. 13, 2012

(65) Prior Publication Data
US 2013/0342787 A1   Dec. 26, 2013

(30) Foreign Application Priority Data

Mar. 10, 2011   (JP) .................................. 2011-053576

(51) Int. Cl.
*G02F 1/1335* (2006.01)
*F21V 21/00* (2006.01)
*F21V 7/00* (2006.01)

(52) U.S. Cl.
CPC .............. *F21V 21/00* (2013.01); *F21V 7/0066* (2013.01); *G02F 1/133603* (2013.01); *G02F 1/133611* (2013.01)

(58) Field of Classification Search
CPC .................... G02F 1/133603; G02F 1/133611; F21V 21/00; F21V 7/0066
USPC ..................................................... 349/61–68
See application file for complete search history.

(56) References Cited

U.S. PATENT DOCUMENTS

| | | | |
|---|---|---|---|
| 7,993,022 B2* | 8/2011 | Bertram | 362/97.3 |
| 2007/0014098 A1* | 1/2007 | Park et al. | 362/29 |
| 2008/0089054 A1 | 4/2008 | Chang | |
| 2012/0057097 A1* | 3/2012 | Shimizu | 349/61 |
| 2012/0099046 A1 | 4/2012 | Kasai | |

FOREIGN PATENT DOCUMENTS

| | | |
|---|---|---|
| CN | 101162316 A | 4/2008 |
| JP | 2007-73295 A | 3/2007 |
| JP | 2007-317423 A | 12/2007 |
| JP | 2010-210750 A | 9/2010 |
| WO | 2009/004841 A1 | 1/2009 |
| WO | 2011/004637 A1 | 1/2011 |

OTHER PUBLICATIONS

Office Action for Taiwanese Application No. 101107941, dated Jun. 20, 2014 with partial English translation.

* cited by examiner

*Primary Examiner* — Bumsuk Won
*Assistant Examiner* — Charles Chang
(74) *Attorney, Agent, or Firm* — Birch, Stewart, Kolasch & Birch, LLP

(57) ABSTRACT

In a surface light source apparatus 1 for irradiating light in a planar form by arranging a plurality of tubular light sources 2 at high density in the middle of a screen so that brightness at the middle of the screen is high, each tubular light source 2 positioned in rows at topmost and bottommost edges is arranged to be closer toward screen corner sections in a plan view so as to compensate for lack of brightness at the screen corner sections in a plan view. In this manner, each tubular light source 2 is arranged by placing each tubular light source 2 in the rows at the topmost and bottommost edges closer in a row direction toward each corner section B of the reflection sheet 5. Thereby, brightness at the middle of a screen is maintained and enhanced, and display quality at corner sections of the screen is improved.

13 Claims, 6 Drawing Sheets

SURFACE LIGHT SOURCE APPARATUS AND LIQUID CRYSTAL DISPLAY APPARATUS

TECHNICAL FIELD

The present invention relates to a surface light source apparatus such as an LED light source apparatus using one or more LED modules where one or more punctiform light sources such as one or more light emitting diodes (LED) are implemented and a liquid crystal display apparatus using such a surface light source apparatus as a backlight.

BACKGROUND ART

Conventional types of liquid crystal display apparatus have a transmissive liquid crystal panel and a backlight behind such a liquid crystal panel.

To a human eye, even if the middle section is bright and peripheral sections are somewhat dark, a screen appears to have a uniform surface light source. Thus, in order to enhance brightness at the middle section of a screen, an LED distribution density is adjusted by arranging an LED substrate closer to the middle section of the screen. Further, the number of LEDs mounted can be reduced by employing a configuration where the shape of a reflective sheet is tilted at peripheral sections of a screen. FIG. 8 illustrates a configuration that reduces the number of LEDs mounted and enhances the brightness at the middle section of the screen in this manner.

FIG. 8 is a plan view that schematically illustrates an example of an LED module arrangement in a conventional LED light source apparatus.

In FIG. 8, a conventional LED light source apparatus 100 is constituted of a plurality of LED modules 101. Here, rectangular LED modules 101 are arranged in a traverse direction in four rows for convenience. Among the four rows of rectangular LED modules 101 in the traverse direction, the rectangular LED modules 101 in the middle two rows are arranged closer to each other toward the middle to enhance brightness at the middle section of the screen.

Each LED module 101 has a printed circuit board 102 and a plurality (10 in this case) of LEDs 103 mounted thereon in series.

A reflective sheet 104 has a plurality of holes for the LEDs 103 to penetrate. The printed circuit board 102 and the reflective sheet 104 are secured in a state where the LEDs 103 penetrate the penetration holes for LEDs from the backside. Lights from a plurality of LEDs 103 are reflected and irradiated forward by the reflection sheet 104 to be a surface light source. The four oblong longitudinal and traverse surfaces of the peripheral section of the screen (peripheral frame section of the screen) of the reflection sheet 104 are constituted by tilted surfaces to open forward.

In this manner, Patent Literature 1 discloses an example in which a plurality of LED modules in the middle rows are placed closer to each other toward the middle to arrange LEDs at a higher density in comparison to the peripheral sections in order to enhance brightness at the middle section of the screen.

CITATION LIST

Patent Literature

Patent Literature 1: International Publication No. WO 2009/004840

SUMMARY OF INVENTION

Technical Problem

In the conventional configuration described above in a backlight system where an arrangement pitch of LEDs is placed closer toward the inside of a screen and peripheries of the screen are constituted by the tilts on a reflective sheet for the purpose of reduction in the number of LEDs and enhancement in brightness at the middle of the screen, brightness at the middle of the screen is high but is somewhat lower at the peripheries of the screen, and in particular screen corners A are prone to decrease in display quality due to lack of brightness. In this manner, as illustrated in FIG. 9, when the number of LEDs is further reduced or when thinning of a backlight is pursued, a phenomenon in which the amount of light reaching the screen corners A is lacking and the screen corners A are rendered dark is prone to occur, due to the enhancement in brightness at the middle of the screen.

The present invention solves the conventional problem described above and is intended to provide a surface light source apparatus such as an LED light source apparatus that can reduce light sources in a surface light source, maintain and enhance brightness at the middle of a screen, and improve display quality at the screen corner sections and a liquid crystal display apparatus using the surface light source apparatus as a backlight.

Solution to Problem

A surface light source apparatus according to the present invention for irradiating a light in a planar form by arranging a plurality of tubular light sources at a high density in a middle of a screen so that brightness at the middle of the screen is high is provided, where the tubular light sources are arranged by placing or expanding an end section of the tubular light sources positioned in at least one row at topmost, bottommost, leftmost, and rightmost edges or in an outermost periphery closer toward a screen corner section in a plan view so as to compensate for a lack of brightness at the screen corner section in a plan view, thereby achieving an objective described above.

Preferably, in a surface light source apparatus of the present invention, the tubular light sources positioned in the at least one row at the topmost, bottommost, leftmost, and rightmost edges or in the outermost periphery are divided into at least two tubular light sources, and each edge section, which is not an edge sections of the at least two divided tubular light sources that are adjacent to each other, is placed closer toward the screen corner section in a plan view to arrange the two tubular light sources.

Still preferably, in a surface light source apparatus of the present invention, the tubular light sources positioned in at least one row at the topmost, bottommost, leftmost and rightmost edges or in the outermost periphery are provided in a single body and each of both edge sections of the single-bodied tubular light sources is expanded toward the screen corner section in a plan view to arrange the single-bodied tubular light sources.

Still preferably, in a surface light source apparatus of the present invention, a position of a point light source of the tubular light sources, which is at an edge section on a side of a screen corner section in a plan view and is positioned in at least one row at the topmost, bottommost, leftmost, and rightmost edges or in the outermost periphery, is determined so that the screen corner section in a plan view is not dark in comparison to the brightness of the entire screen.

Still preferably, in a surface light source apparatus of the present invention, each of the two tubular light sources is arranged while being tilted in a plan view such that edge sections that are not opposing edge sections of the two tubular light sources are each placed closer toward the screen corner section in a plan view and the opposing edge sections of the two tubular light sources are placed closer towards the middle section.

Still preferably, in a surface light source apparatus of the present invention, arrangement pitches of the plurality of tubular light sources are placed closer together with each other toward the middle of the screen in a plan view so that the middle of the screen in a plan view is in a dense state.

Still preferably, in a surface light source apparatus of the present invention, the tubular light sources are tubular light sources with the same structure or have tubular light sources with different structures.

Still preferably, in a surface light source apparatus of the present invention, the tubular light sources have a printed circuit board and one or more point light sources mounted on the printed circuit board.

Still preferably, in a surface light source apparatus of the present invention provided with a reflection means, the reflection means irradiates a light in a planar form by each one or more point light sources or one or more light diffusion lenses that cover the one or more point light sources to diffuse a light being passed through each hole and an outgoing light from each of the point light sources is reflected forward.

Still preferably, in a surface light source apparatus of the present invention, in a screen peripheral section of the reflection means, each of four oblong longitudinal and transverse surfaces is configured with a tilted surface to open forward.

Still preferably, in a surface light source apparatus of the present invention, in a screen peripheral section, the plurality of point light sources mounted on the tubular light sources are arranged at a low density to extract light at a tilted surface in the perimeter of the reflection means.

Still preferably, in a surface light source apparatus of the present invention, the tubular light sources are LED modules or fluorescent light means.

Still preferably, in a surface light source apparatus of the present invention, the point light sources are LED means or laser element means.

The liquid crystal display apparatus of the present invention is that described above of the present invention, thereby achieves the objective described above.

The functions of the present invention having the structures described above will be described hereinafter.

In the present invention, in a surface light source apparatus for irradiating a light in a planar form by arranging a plurality of tubular light sources at a high density in a middle of a screen so that brightness at the middle of the screen is high, wherein the tubular light sources are arranged by placing or expanding an end section of the tubular light sources positioned in at least one row at topmost, bottommost, leftmost, and rightmost edges or in an outermost periphery closer toward a screen corner section in a plan view so as to compensate for lack of brightness at the screen corner section in a plan view.

Thereby, in a surface light source apparatus for irradiating a light in a planar form by arranging a plurality of tubular light sources at a high density in a middle of a screen so that brightness at the middle of the screen is high, the tubular light sources positioned in at least one row at topmost, bottommost, leftmost, and rightmost edges or in an outermost periphery are arranged by being placed closer toward a screen corner section in a plan view so as to compensate for lack of brightness at the screen corner section in a plan view. Thus, it is possible to reduce light sources in a surface light source, maintain and enhance brightness at the middle of the screen, and improve display quality at the screen corner sections.

Advantageous Effects of Invention

According to the present invention as described above, in a surface light source apparatus for irradiating a light in planar form by arranging a plurality of tubular light sources at a high density at the middle of a screen so that brightness at the middle of a screen is high, the tubular light sources positioned in at least one row at the topmost, bottommost, leftmost, and rightmost edges or in outermost periphery are arranged by being placed closer toward screen corner sections in a plan view so as to compensate for the lack of brightness at the screen corner sections in a plan view. Thus, it is possible to reduce light sources in a surface light source, maintain and enhance brightness at the middle of the screen, and improve display quality at the screen corner sections.

Figure 1:
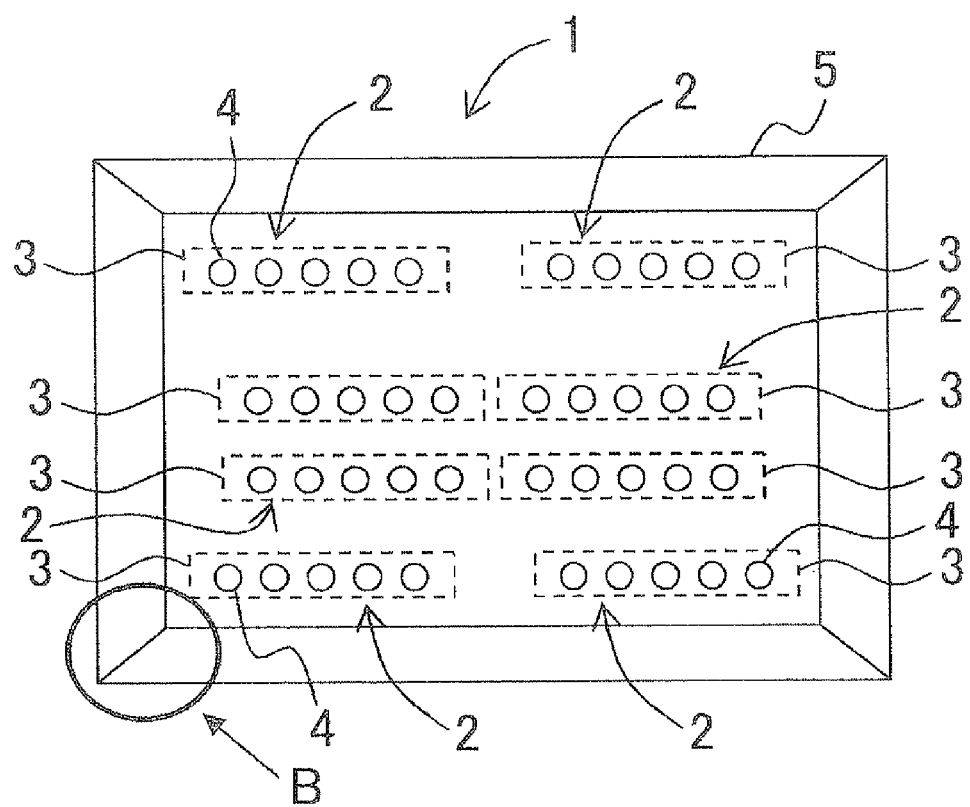
FIG. 1 is a plan view that schematically illustrates an example of an LED module arrangement of an LED light source apparatus in Embodiment 1 of the present invention.

1, 1A-1D LED light source apparatus (surface light source apparatus)
2, 2A-2C LED module (tubular light source)
3 printed circuit board
4 LED (point light source)
5 reflection sheet
5a tilted surface
6 BL chassis
7 lens
8 light diffusion lens
20 liquid crystal display apparatus,
21 optical sheet
22 light transmissive liquid crystal panel
B, B1-B4 corner sections
B5 middle section of a screen
S brightness lacking region
r distance
d distance from LED to end section of the reflection sheet

DESCRIPTION OF EMBODIMENTS

Hereinafter, cases where a surface light source apparatus of the present invention is applied to an LED light source apparatus are regarded as Embodiments 1 and 2, and Embodiment 3 for a liquid crystal display apparatus using one of Embodiments 1 and 2 of the LED light source apparatus as a backlight will be explained in detail by referring to the Figures. In addition, with respect to the prepared figures, thicknesses, lengths or the like of each element in each figure are not limited to the configuration shown in the figure.

(Embodiment 1)

FIG. 1 is a plan view that schematically illustrates an example of an LED module arrangement of an LED light source apparatus in Embodiment 1 of the present invention.

In FIG. 1, an LED light source apparatus 1 of the present Embodiment 1 is constituted of a plurality of LED modules 2. Here, the oblong rectangular LED modules 2 are arranged in four rows in a traverse direction for convenience. Among the four rows of rectangular LED modules 2 in the traverse direction, the middle two rows of the rectangular LED modules 2 are arranged such that arrangement pitches thereof are closer to each other toward the middle so that LEDs in the middle are dense to enhance brightness at the middle section of the screen.

Each LED module 2 has a printed circuit board 3 and a plurality (5 in this case) of LEDs 4 mounted thereon in series. Here, each row of LED modules 2 is constituted of two LED modules 2, and on the two LED modules 2, LEDs 4 are moved closer to be arranged such that the arrangement pitch of LEDs 4 is equidistance.

In contrast, although two LED modules 2 are arranged in one row, in peripheral sections of the screen, especially in each row of LED modules 2 on the topmost and bottommost ends, each LED module 2 is arranged by placing ends on the outside, which are not the end sections of the LED modules 2 facing each other, closer toward screen corners (corner sections) B of a reflection sheet 5 so that the amount of light reaching the corners of the reflection sheet 5 as a reflecting means is not lacking (so that lack of brightness at the corner sections B in a plan view is compensated). Brightness at which the amount of light reaching the corner sections B is not lacking refers to a luminous intensity where the corner sections B are neither particularly dark nor strange upon illumination of the entire screen.

Thus, although each of the two LED modules 2 in at least the topmost row and the bottommost row (rows at top and bottom most ends) are arranged in one row, edge sections of the two LED modules 2 facing each other are spaced for the amount the LED modules are moved closer to the corners. Each of the two LED modules 2 are placed closer to the corner sections of the reflection sheet 5 for the amount of distance of the spaced edge sections for arranging each LED module 2 so that sufficient amount of light reaches the screen corner sections B.

In the reflection sheet 5, a plurality of holes for lenses 7 mounted on the LEDs 4 (FIG. 5) to penetrate are opened at predetermined arrangement positions for the number of LEDs 4. The printed circuit board 3 and the reflective sheet 5 are secured in a state where the lenses 7 mounted on the LEDs 4 penetrate the penetration holes for LEDs from the backside of the reflection sheet 5. Lights from the plurality of LEDs 4 pass through the lenses and are reflected by the reflection sheet 5 to be irradiated forward, thereby the LED light source apparatus 1 is regarded as a surface light source. In the peripheral sections of the screen (peripheral frame section of the screen) of the reflection sheet 5, four oblong longitudinal and traverse surfaces are constituted by tilted surfaces 5a (FIG. 5) to open forward.

In this manner, in order to enhance brightness at the middle section of the screen, a light source apparatus is configured such that a plurality of LED modules 2 in the middle rows are placed closer toward the middle with respect to each other and the LEDs 4 are arranged at a high density at the middle section, and the LEDs 4 are arranged at a low density at the peripheral sections of the screen to extract a light in the tilted sections surrounding the reflection sheet 5. In addition, in order to compensate for a light at the corner sections 8, LED modules 2 in both rows at the furthest edges or in the outermost periphery are divided into at least two LED modules 2 and each LED module 2 is arranged by placing the edge sections, which are not the edge sections of the two LED modules 2 facing each other, closer toward the corner sections B of the reflection sheet 5 in order to compensate for the light at the corner sections B.

According to the present Embodiment 1 as described above, in the LED light source apparatus 1 that irradiates a light in a planar form by arranging a plurality of LED modules 2 at a high density in the middle of the screen so that brightness at the middle of the screen is high, each LED module 2 positioned in rows at the topmost and bottommost edges (or leftmost and rightmost edges) is arranged by being placed closer towards the screen corner sections in a plan view to compensate for the lack of brightness at the screen corner sections in a plan view.

In this manner, each LED module 2 is arranged by placing the LED module 2 in the rows at the topmost and bottommost edges (or leftmost and rightmost edges) in the row direction (longitudinal direction of the LED module 2) closer toward the corners sections B of the reflection sheet 5. Thus, even in a state where the number of LEDs of the LED module 2 is reduced and brightness at the middle of the screen is enhanced, the display quality at the screen corner sections B can be improved by compensating the amount of light at the screen corner sections B.

In the present Embodiment 1, a case has been explained where a row of LED modules positioned in the row at the topmost and bottommost edges is divided into two LED modules 2 and the two divided LED modules 2 are arranged such that each edge section on the outside, which is not the edge section on the inside adjacent to each other, is placed closer towards the corner section side in a plan view together with the LEDs 4 mounted on the LED module 2 to compensate for the lack of brightness at the corner sections B in a plan view. However, the present invention is not limited thereto. The LED modules may be arranged such that the edge sections of the LED modules positioned not only in the rows at the topmost and bottommost edges in the traverse direction, but also in a row of at least one of the topmost, bottommost, leftmost, and rightmost edges in the longitudinal and traverse directions or in the outermost periphery are placed closer toward the corner sections B in a plan view together with LEDs mounted thereon to compensate for the lack of brightness at the corner sections B in a plan view.

Figure 2:
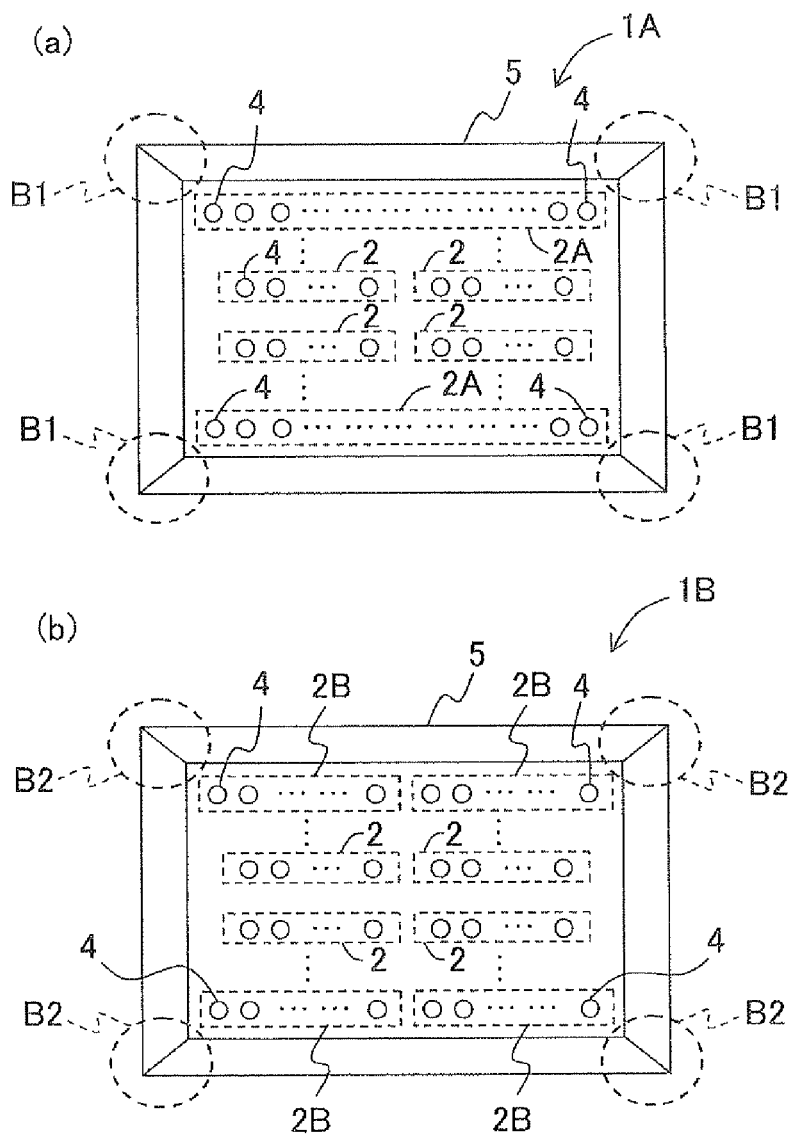
FIGS. 2(a) and 2(b) are plan views that schematically illustrate a modified example of an LED module arrangement of the LED light source apparatus in FIG. 1.

That is, in the present Embodiment 1, LED modules in both rows at the furthest edges (here, rows at the topmost and bottommost edges) or in the outermost periphery (here, sides at the topmost and bottommost edges) are divided into at least two LED modules 2 and each LED module 2 is arranged by placing them closer toward each of the corner sections B of the reflective sheet 5. However, the present invention is not limited thereto. As illustrated in FIG. 2(a), LED modules 2A in both rows at the furthest edges (here, the rows at the topmost and bottommost edges, but may be those at the leftmost and rightmost edges) or in the outermost periphery in an LED light source apparatus 1A may be configured with more LEDs 4 and extended (expanded) to be longer as a single body toward the corner sections of the reflection sheet 5 as in corner sections B1 in a plan view than the above-described case where two LED modules 2 are arranged in one row. By such a configuration, in the present Embodiment 1, the other sides of the edges of the LED modules 2 are separated at the middle side of the row by placing the LED modules 2 in both rows at the furthest edges or in the outermost periphery closer toward the corner sections B1 of the reflection sheet 5. Thus, the possibility of creating lack of brightness at the separated, opposing edge sections can be prevented. However, it is necessary to have two types of LED modules 2 and 2A with different number of LEDs 4 at the middle region and the peripheral region and it is also necessary to have two types of applied voltages. In order to brighten the corner sections B1, besides using a dedicated single body LED module 2A, as illustrated in FIG. 2(b), two LED modules 2B dedicated to the both rows at the furthest edges or outermost periphery in an LED light source apparatus 1B can be used in one row. In this case, the two dedicated LED modules 2B are arranged in a state extended toward the corner section of the reflection sheet 5 as in a corner section B2 in a plan view of FIG. 2(b) with LEDs 4.

Figure 3:
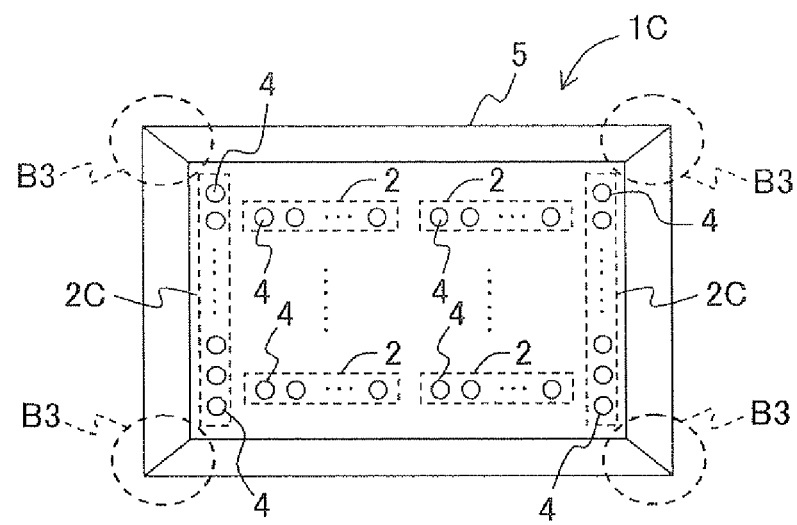
FIG. 3 is a plan view that schematically illustrates another modified example of an LED module arrangement of the LED light source apparatus in FIG. 1.

Further, as illustrated in FIG. 3, a long LED module 2C dedicated to both rows at the furthest edges in the longitudinal direction (here, the rows at the leftmost and rightmost edges) or in the outermost periphery (here, the sides of the leftmost and rightmost edges) in an LED light source apparatus 1C may be used by being expanded as a single body in one row in the longitudinal direction. In this case, the edge sections of the dedicated LED modules 2C are arranged in a state of being extended (expanded) with LEDs 4 towards the corner sections of the reflective sheet 5 as in the corner sections B3 of FIG. 3 to compensate for the lack of the amount of light at the corner sections B3. Between the long dedicated LED modules 2C in the longitudinal direction, the LED modules 2 may be provided in the middle section a plurality of rows of LED modules 2 so as to crowd the middle section to raise the brightness at the middle, with two LED modules 2 as one row in the traverse direction as arranged herein, although the arrangement may be in the longitudinal direction. Furthermore, the long dedicated LED module 2C in the longitudinal direction may be divided into two or three as in the case of FIG. 2(b).

In sum, the LED modules 2A and 2C positioned in at least one row of the topmost, bottommost, leftmost, and rightmost edges or the outermost periphery are provided by expanding as a single body, and the single-bodied LED modules 2A and 2C are arranged by placing the sides of both edge sections of each of the single-bodied LED modules 2A and 2C closer toward the corner sections B1 or B3 in a plan view with LEDs 4. The position of LEDs 4 at the edge sections on the corner sections B1 and B3 sides of the LED modules 2A and 2C positioned in at least one row of the topmost, bottommost, leftmost, and rightmost edges or in the outermost periphery is determined such that the difference in brightness between the middle section and the corner sections B1 or B3 is less than a predetermined value so that the corner sections B1 and B3 in a plan view do not become dark with respect to the entire screen. The same applies when the LED modules in the same row are divided into two or three.

Figure 4:
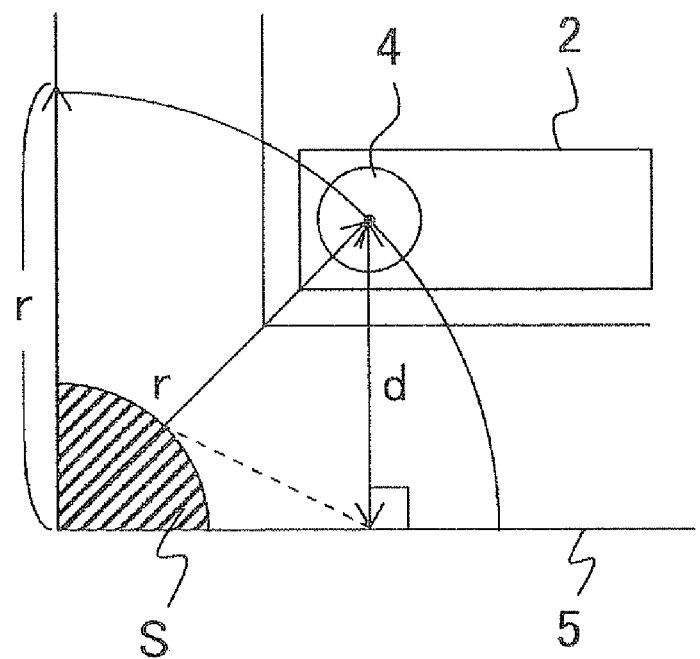
FIG. 4 is a plan view that schematically illustrates an example where LED positions are considered in order to compensate for the lack of brightness at the corner sections of the LED light source apparatus of FIG. 1.

In sum, as illustrated in FIG. 4, even if a light reaches a distance d from the LED 4 to the edge side section of the reflection sheet 5 and there were no lack of brightness, it is harder for a light to reach the corner section of the reflection sheet 5 from the LED 4 as the distance is longer in the diagonal direction. The LED 4 needs to be positioned within a range of radius with a distance r which is needed to compensate brightness in a brightness lacking region S of the corner sections. Thus, it would suffice to arrange the LED module 2 so that the LED 4 is present within the range of radius with the distance r.

Furthermore, the following Embodiment 2 is shown for a case of resolving the lack of brightness in the middle section of both of the rows at the furthest ends described above only by devising the arrangement of LED modules 2 by using only the LED modules 2, which are LED substrates with the same number of LEDs 4 and the same structure.

Although no particular illustration was provided for explanation in the present Embodiment 1, the configuration of the longitudinal section of the corner section B of the LED light source apparatus 1 of the present Embodiment 1 will be briefly explained.

Figure 5:
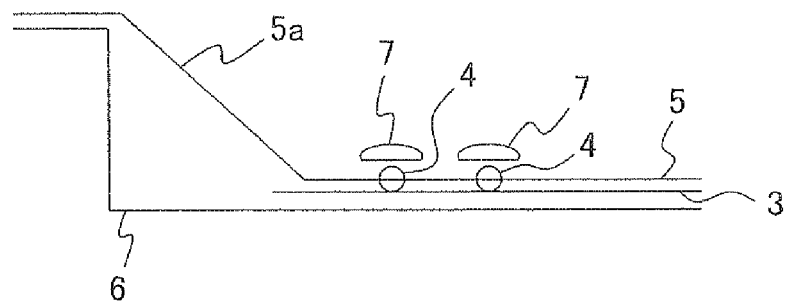
FIG. 5 is a longitudinal section of the corner section of the LED light source apparatus of FIG. 1.

FIG. 5 is a longitudinal section of the corner section of the LED light source apparatus 1 of FIG. 1.

As illustrated in FIG. 5, the reflection sheet 5, on which the tilted surface 5a is provided in the peripheral section, is disposed on a BL chassis. The printed circuit board 3 and the reflective sheet 5 are secured in a state where the lenses 7 mounted on the LEDs 4 penetrate the penetration holes for LEDs of the reflection sheet 5 from the backside of the reflection sheet 5. Thereby, the LED light source apparatus 1 is configured, where a light from the LEDs 4 passes through the lens 7 and is reflected by the reflection sheet 5 to be irradiated forward to be a surface light source.

Further, if the arrangement of the LED modules 2 is sequentially and gradually moved toward the corner sections from the middle section, a somewhat dark line is created on the screen. For this reason, in the present Embodiment 1, it is effective for the uniformity of screen illuminance seen from a human eye to place only each arrangement of the LED modules 2 in both rows of the furthest edges or in the outermost periphery in the LED light source apparatus 1 closer toward the corner section. In sum, it is important that lack of brightness at the corner sections is compensated by using only the arrangement of the LED modules 2 in both rows at the furthest edges or in the outermost periphery, not simply placing the LEDs closer because the corner section side of the screen is dark.

(Embodiment 2)

Figure 6:
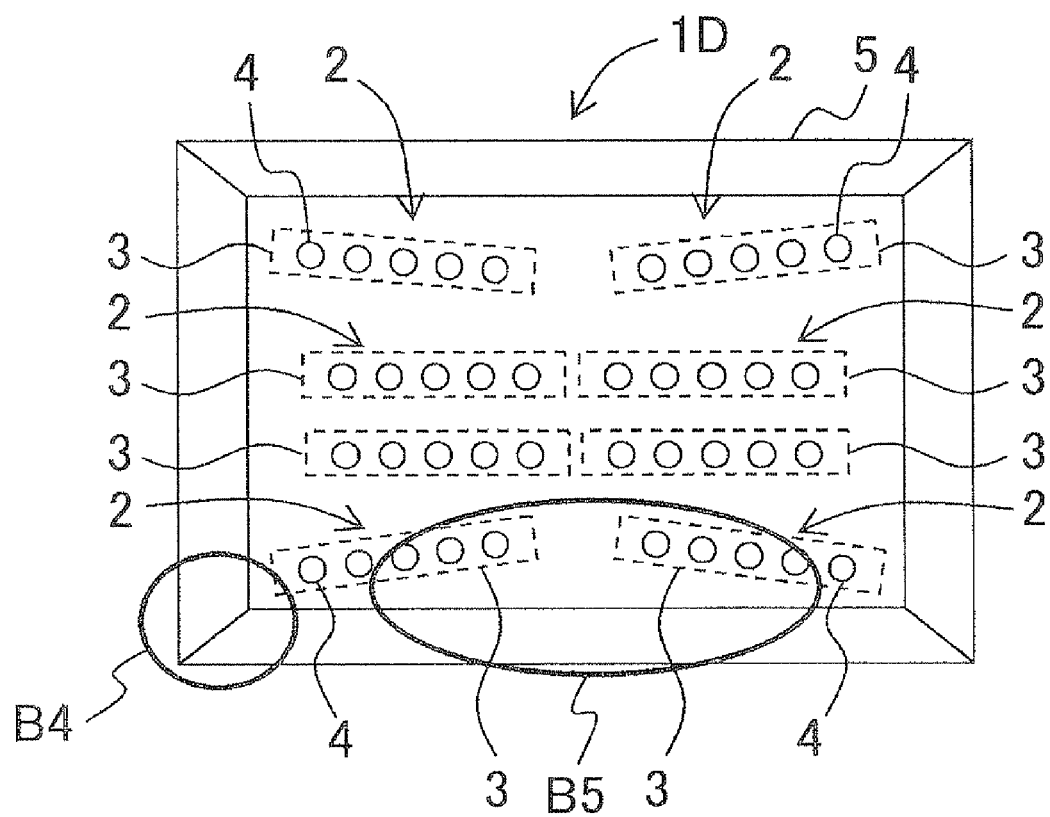
FIG. 6 is a plane view that schematically illustrates an example of an LED module arrangement of an LED light source apparatus in Embodiment 2 of the present invention.

FIG. 6 is a plane view that schematically illustrates an example of an LED module arrangement of an LED light source apparatus in Embodiment 2 of the present invention.

In FIG. 6, in an LED light source apparatus 1D of the present Embodiment 2, a plurality of LED modules 2 are arranged. Oblong rectangular LED modules 2 with the same number of LEDs mounted and the same structure are arranged in four rows in the traverse direction herein for convenience. Among the four rows of rectangular LED modules 2 in the traverse direction, the rectangular LED modules 2 in the middle two rows are arranged such that arrangement pitches thereof are placed closer to each other toward the middle so that LEDs in the middle are in a dense state to enhance brightness at the middle section of the screen.

Each LED module 2 has a printed circuit board 3 and a plurality (5 in this case) of LEDs 4 mounted thereon in series. Here, each row of LED module 2 is constituted of two LED modules 2, and on the two LED modules 2, LEDs 4 are moved closer to be arranged such that the arrangement pitch of LEDs 4 is equidistance.

In contrast, in peripheral sections of a screen, especially in each row of LED modules 2 at the topmost and bottommost ends, although two LED modules 2 are arranged in one row, each LED module 2 is arranged by placing one end on the outside of the LED modules 2 closer toward the corner sections B4 (screen corners) of the reflection sheet 5 so that the amount of light reaching corner sections of the reflection sheet 5 is not lacking. Thus, even if each of the two LED modules 2 of at least the topmost row and the bottommost row is arranged in one row, two LED modules 2 are spaced for the amount the LED modules are moved closer to the corners. In addition, each LED module 2 is arranged while tilted diagonally in a plan view to be closer toward the corner sections B4 and middle section B5 of the screen so as to compensate the amount of light at the middle section B5 of the screen. Each LED module 2 can be arranged so that the two LED modules 2 are each placed closer to the corner sections of the reflection sheet 5 and compensate for the light in the middle section of the screen and a sufficient amount of light reaches the screen corners A for the amount of the separation and tilt.

In the reflection sheet 5, a plurality of holes for lenses 7 mounted on the LEDs 4 to penetrate are opened at predetermined arrangement positions for the number of LEDs 4. The printed circuit board 3 and the reflective sheet 5 are secured in a state where the lenses 7 mounted on the LEDs 4 penetrate the penetration holes for LEDs from the backside of the reflection sheet 5. Lights from the plurality of LEDs 4 pass through the lens and are reflected by the reflection sheet 5 to be irradiated forward, thereby the LED light source apparatus 1D is regarded as a surface light source. In the peripheral sections of the screen (peripheral frame section of the screen) of the reflection sheet 5, four oblong longitudinal and traverse surfaces are constituted by tilted surfaces 5a to open forward.

In this manner, the light source apparatus is configured such that a plurality of LED modules 2 of the middle rows are placed closer toward the middle with respect to each other and the LEDs 4 are arranged at a high density in the middle section, and the LEDs 4 are arranged at a low density in the peripheral sections of the screen to extract a light at the tilted sections in the perimeter of the reflection sheet 5 to enhance brightness at the middle section of the screen. In addition, the LED module 2 in rows at both the furthest edges or in the outermost periphery is divided into at least two LED modules 2 and each LED module 2 is arranged while being tilted in a plan view such that one end is placed closer to each corner section of the reflection sheet 5 and the other end is placed closer toward the center section. The reduced light toward the center section from the space created between the two LED modules by placing one end closer toward each of the corner sections of the reflection sheet 5 is compensated by placing the other end of the two LED modules 2 being placed closer toward the middle section to compensate for the light toward the middle section. That is, in order to smooth out the change in brightness from the middle section to the peripheral sections (drastic change is noticeable to a human eye), LED modules 2 are arranged while being tilted in a plan view such that a row of LED modules 2 on the top and bottom are divided into two, one end of each LED module 2 is placed closer to the corner section of the reflection sheet 5, and the other end is placed closer to the middle section. In this manner, the number of LEDs of an LED module is reduced, brightness at the middle of a screen is enhanced, and display quality at corner sections of the screen is improved only by devising the arrangement by using the LED modules 2, which are LED substrates with the same configuration.

According to the present Embodiment 2 as described above, each LED module 2 is arranged with a tilt such that each of the one end of the LED module 2 at the furthest edges is placed closer to the corner sections of the reflection sheet 5 and the other ends of the LED modules 2 are placed closer to the middle section. Thus, the distance from the LED 4 to the corner sections of the reflection sheet 5 becomes smaller to inhibit decrease in brightness at the corner sections of the reflection sheet 5 and a change in brightness from the middle section to the periphery is smoothed out and unevenness in brightness is reduced by arranging each LED module 2 with a tilt. In this manner, it is possible to reduce the number of LEDs of an LED module, enhance brightness at the middle of the screen, and improve the display quality at corner sections of a screen.

(Embodiment 3)

In a liquid crystal display apparatus of the present Embodiment 3, any one of the LED light source apparatuses 1 and 1A-1D of FIGS. 1-3 and 6 can be incorporated into the liquid crystal display apparatus as a backlight. However, a case where the LED light source apparatus 1 of FIG. 1 is incorporated into a liquid crystal display apparatus as a backlight will be explained herein using FIG. 7.

Figure 7:
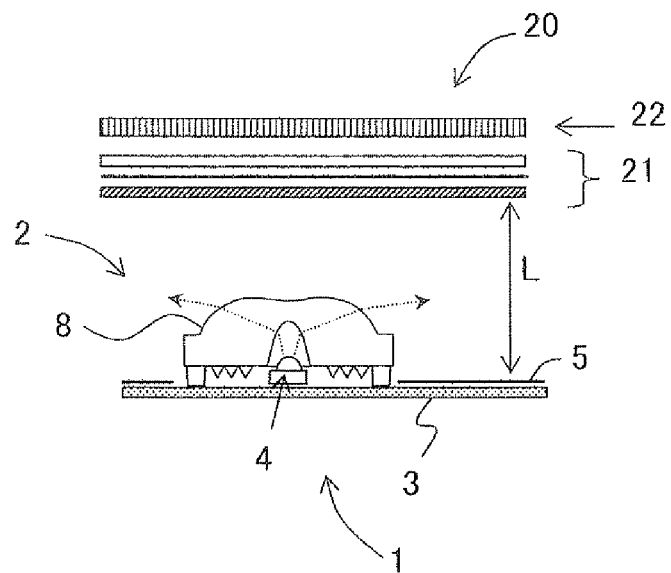
FIG. 7 is a longitudinal section that schematically illustrates an example of a configuration of substantial parts of a liquid crystal display apparatus incorporating the LED light source apparatus 1 of FIG. 1.
Figure 8:
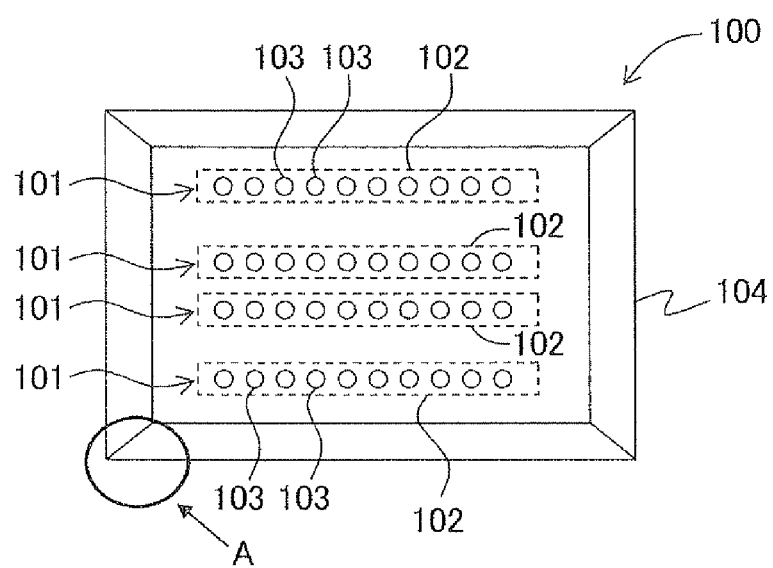
FIG. 8 is a plan view that schematically illustrates an example of an LED module arrangement in a conventional LED light source apparatus.
Figure 9:
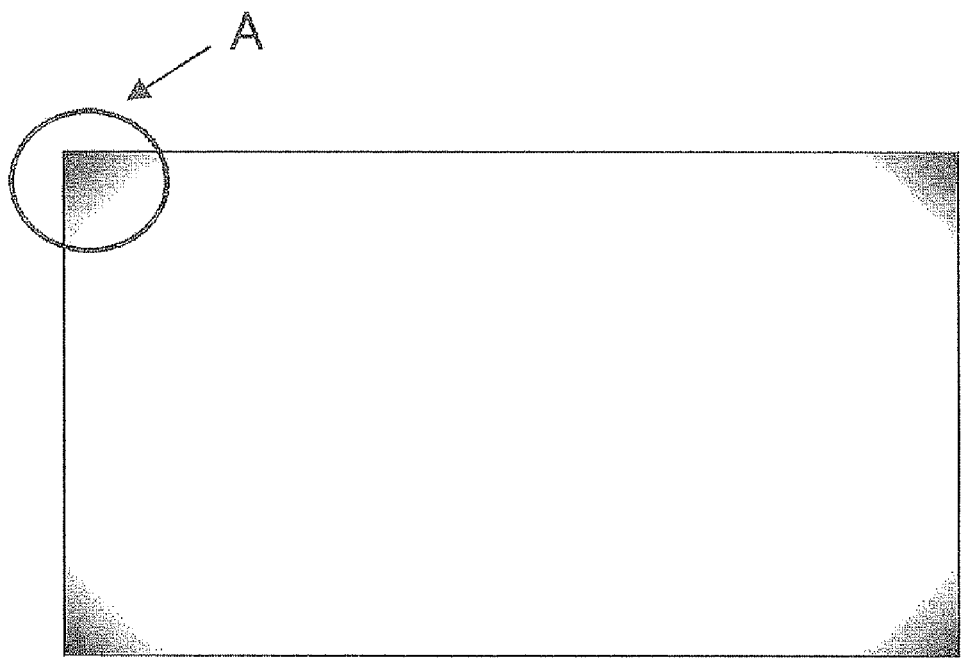
FIG. 9 is a diagram of a screen illuminated by the LED light source apparatus of FIG. 8.

FIG. 7 is a longitudinal section that schematically illustrates an example of a configuration of substantial parts of a liquid crystal display apparatus incorporating the LED light source apparatus 1 of FIG. 1.

In FIG. 7, a liquid crystal display apparatus 20 of the present Embodiment 3 comprises: the LED light source apparatus 1 of the present Embodiment 1 that is an LED backlight wherein a plurality of LED modules, in which a plurality of LEDs 4 are arranged on a printed circuit board 3 and each light diffusion lens 8 is provided as the aforementioned lens 7 so as to cover each LED 4, are arranged closer toward each corner section and emit a surface light; an optical sheet 21 including a light diffusion sheet or the like provided above the LED light source apparatus 1 with only a distance L from the reflection sheet 5; and a light transmissive liquid crystal panel 22 that enables liquid crystal image display based on a display signal.

The LED light source apparatus 1 is configured such that a plurality of LED modules 2 of the middle rows are placed closer toward the middle with respect to each other and the LEDs 4 are arranged at a high density in the middle section, and the LEDs 4 are arranged at a low density in the peripheral sections of the screen to extract a light at the tilted sections (tilted surface 5a) in the perimeter of the reflection sheet 5. In addition, in order to compensate for the light at the corner sections, LED modules 2 in both rows at the furthest edges or in outermost periphery are divided into at least two LED modules 2 and each LED module 2 is arranged by being placed closer toward each corner section of the reflection sheet 5 in the LED light source apparatus 1. The LED modules 2 have a plurality of LEDs 4 provided on each printed circuit board 3 and each light diffusion lens 8 covering each LED 4.

Accordingly to the present Embodiment 3 as described above, one of LED light source apparatuses 1 and 1A-1D for irradiating a light in a planar form by arranging a plurality of LED modules at a high density in the middle of the screen so that brightness at the middle of the screen is high, wherein the LED modules are arranged such that the edge section of the LED module positioned in at least one of the rows at the topmost, bottommost, leftmost, and rightmost edges or in the outermost periphery, together with one or more LEDs mounted thereon, is placed closer or is expanded toward the screen corner section in a plan view to compensate for the lack of brightness of the screen corner sections in a plan view, is provided on the backside of the light transmissive liquid crystal panel 22 for use as a backlight.

Thereby, in the liquid crystal display apparatus 20 of the present Embodiment 3, lack of brightness at the screen corner sections in a plan view is resolved to be without any particularly dark corner in the entire screen, and a light can be irradiated in a planar form, and good images without strangeness can be displayed.

In the above Embodiments 1-3, the surface light source apparatus of the present invention is applied to the LED light source apparatuses 1 and 1A-1D. That is, cases have been explained in Embodiments 1-3 in which each of the LED modules 2 and 2A-2C positioned in the rows at the topmost and bottommost edges (or rows at the leftmost and rightmost edges) is arranged by being expanded or placed closer toward the screen corner sections in a plan view to compensate for lack of brightness at the screen corner sections in a plan view, in the LED light source apparatuses 1 and 1A-1D for irradiating a light in a planar form by arranging plurality of LED modules 2 at a high density in the middle of the screen so that brightness at the middle of the screen is high. However, a fluorescent means having a fluorescent light can be used instead of the LED modules 2 and 2A-2C. In this case, although the arrangement, size, and number of fluorescent means having a fluorescent light are somewhat different from the case of LED modules 2 and 2A-2C, the object of the present invention of reducing the number of light sources while enhancing the brightness at the middle of the screen to improve the display quality at the screen corner sections can be achieved by expanding or placing a fluorescent light closer toward the screen corners in a plan view so as to compensate for the lack of brightness at the screen corner sections in a plan view.

Further, in the above Embodiments 1-3, the surface light source apparatus of the present invention is applied to the LED light source apparatuses 1 and 1A-1D to obtain white or whitish color by using the LEDs 4 (comprising an illuminant) as the LED means. However, the present invention is not limited thereto. White or whitish color can be obtained by using a laser element and an illuminant as a laser element means. In this case, the object of the present invention of reducing the number of light sources while enhancing the brightness at the middle of the screen to improve the display quality at the screen corner sections can also be achieved by expanding or placing a laser element (including an illuminant) mounted on a substrate closer toward the screen corner sections in a plan view so as to compensate for the lack of brightness at the screen corner sections in a plan view.

In sum, an LED module or a fluorescent light means can be a tubular light source. Further, an LED means or laser element means can be a point light source. If a plurality of point light sources are arranged in a line, the arrangement becomes a tubular light source. Such a tubular light source encompasses a module where a plurality of laser element means are arranged in a line on a substrate as a point light source, besides LED modules and fluorescent light means.

Thus, the surface light source apparatus of the present invention is configured such that in a surface light source apparatus for irradiating a light in a planar form by arranging a plurality of tubular light sources at a high density in the middle of the screen so that the brightness of the middle of the screen is high, the tubular light sources are arranged by expanding or placing the edge section of the tubular light source positioned in at least one of the rows at the topmost, bottommost leftmost, and rightmost edges or in the outermost periphery closer toward the screen corner sections in a plan view to compensate for the lack of brightness of the screen corner sections in a plan view. The object of the present invention of reducing the number of light sources while enhancing the brightness at the middle of the screen to improve the display quality at the screen corner sections can also be achieved thereby.

As described above, the present invention is exemplified by the use of preferred embodiments 1-3 of the present invention. However, the present invention should not be interpreted solely based on the embodiments 1-3. It is understood that the scope of the present invention should be interpreted solely based on the claims. It is also understood that those skilled in the art can implement equivalent scope of technology, based on the description of the present invention and common knowledge from the description of the detailed preferred embodiments 1-3 of the present invention. Furthermore, it is understood that any patent, any patent application and any references cited in the present specification should be incorporated by reference in the present specification in the same manner as the contents are specifically described therein.

[Industrial Applicability]

The present invention can reduce the number of light sources while enhancing the brightness at the middle of the screen to improve the display quality at the screen corner sections in the field of an LED light source apparatus using one or more LED modules where one or more light emitting diodes (LED) are implemented and a liquid crystal display apparatus using such an LED light source apparatus as a backlight.

The invention claimed is:

1. A surface light source apparatus for irradiating a light in a planar form by arranging a plurality of oblong light sources at a high density in a middle section of a screen so that brightness at the middle section of the screen is high, wherein
    the plurality of oblong light sources have oblong light sources positioned at the middle section and oblong light sources positioned in at least one row at topmost, bottommost, leftmost, and rightmost edges or in an outermost periphery,
    the oblong light sources are arranged by placing an end section of the oblong light sources positioned in the at least one row at topmost, bottommost, leftmost, and rightmost edges or in the outermost periphery closer toward a screen corner section in a plan view so as to compensate for a lack of brightness at the screen corner section in a plan view; and wherein
    the oblong light sources positioned in the at least one row at the topmost, bottommost, leftmost, and rightmost edges or in the outermost periphery are divided into at least two oblong light sources, and each light source on the edge sections, which are not edge sections of the at least two divided oblong light sources that are adjacent to each other, is placed closer toward the screen corner section in a plan view, from a longitudinally or transversely aligned position of light sources on the end sections of the oblong light sources positioned at the middle section which correspond to the light sources of the end sections, to arrange the two oblong light sources.

2. A surface light source apparatus of claim 1, wherein
    a position of a point light source of the oblong light sources, which is at an edge section on a side of the screen corner section in a plan view and is positioned in the at least one row at the topmost, bottommost, leftmost, and rightmost edges or in the outermost periphery, is determined so that the screen corner section in a plan view is not dark in comparison to the brightness of the entire screen.

3. A surface light source apparatus of claim 1, wherein
each of the two oblong light sources is arranged while being tilted in a plan view such that edge sections that are not opposing edge sections of the two oblong light sources are each placed closer toward the screen corner section in a plan view and the opposing edge sections of the two oblong light sources are placed closer towards the middle section.

4. A surface light source apparatus of claim 1, wherein
arrangement pitches of the plurality of oblong light sources are placed closer together with each other toward the middle of the screen in a plan view so that the middle of the screen in a plan view is in a dense state.

5. A surface light source apparatus of claim 1, wherein
the oblong light sources are oblong light sources with the same structure.

6. A surface light source apparatus of claim 1, wherein
the oblong light sources are oblong light sources that are either light emitting modules or fluorescent means with different structures.

7. A surface light source apparatus of claim 1, wherein
the oblong light sources have a printed circuit board and one or more point light sources mounted on the printed circuit board.

8. A surface light source apparatus of claim 7 provided with a reflection means, wherein
the reflection means irradiates a light in a planar form by each of the one or more point light sources or one or more light diffusion lenses that cover the one or more point light sources to diffuse a light being passed through each hole and an outgoing light from each of the point light sources is reflected forward.

9. A surface light source apparatus of claim 8, wherein
in a screen peripheral section of the reflection means, each of four oblong longitudinal and transverse surfaces is configured with a tilted surface to open forward.

10. A surface light source apparatus of claim 8, wherein
in a screen peripheral section, the plurality of point light sources mounted on the oblong light sources are arranged at a low density to extract light at a tilted surface in the perimeter of the reflection means.

11. A surface light source apparatus of claim 1, wherein
the oblong light sources are LED modules or fluorescent light means.

12. A surface light source apparatus of claim 2, wherein the point light sources are LED means or laser element means.

13. A liquid crystal display apparatus, wherein
a surface light source apparatus of claim 1 is provided on a backside of a liquid crystal panel for use as a backlight.

* * * * *